W. W. PENRY.
WATER CARRIER.
APPLICATION FILED JAN. 26, 1911.
1,038,641.
Patented Sept. 17, 1912.
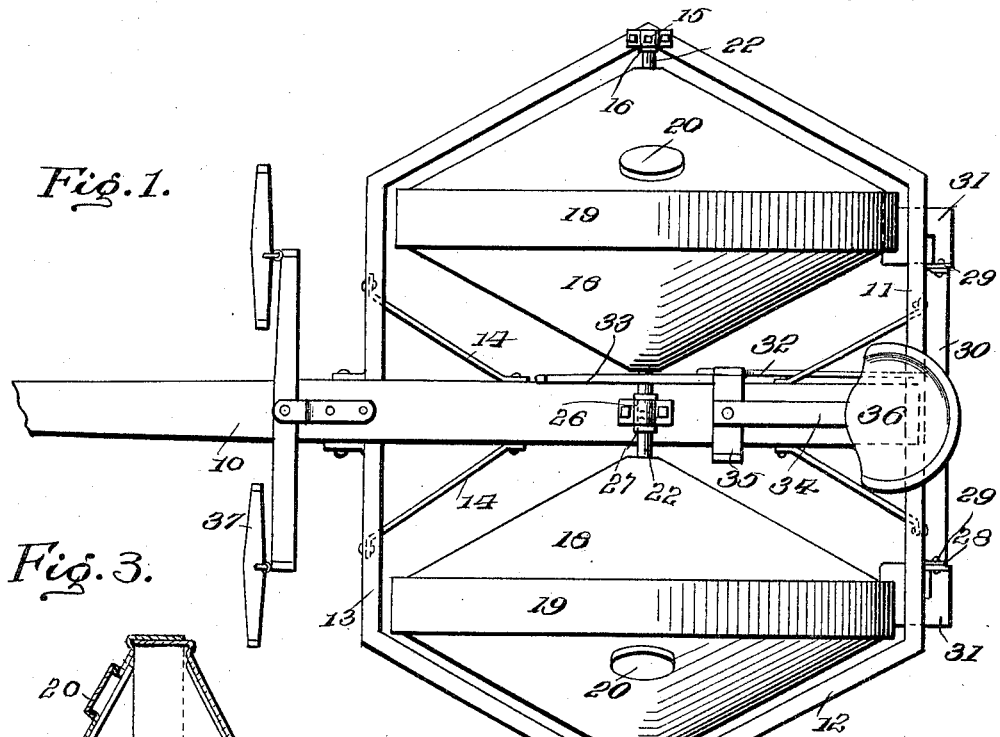
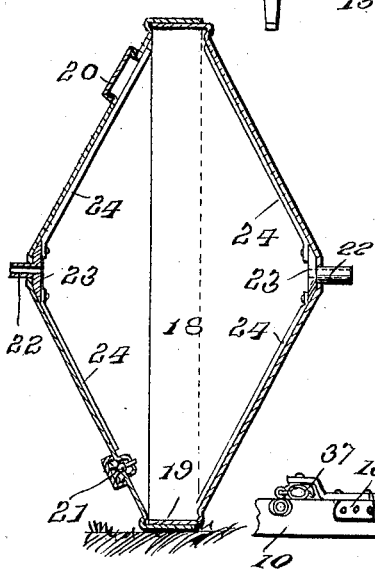
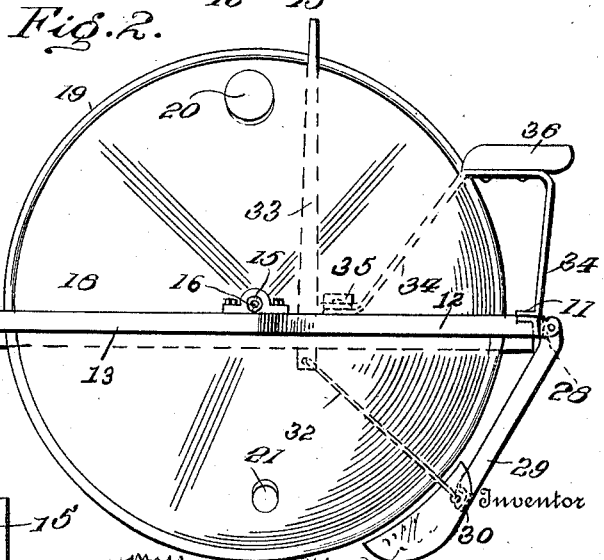
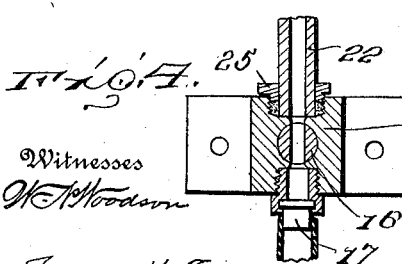
Witnesses
Inventor
W. W. Penry
By Attorneys

UNITED STATES PATENT OFFICE.

WILBERT W. PENRY, OF ECHO, OREGON.

WATER-CARRIER.

1,038,641.  Specification of Letters Patent.  Patented Sept. 17, 1912.

Application filed January 26, 1911. Serial No. 604,912.

*To all whom it may concern:*

Be it known that I, WILBERT W. PENRY, a citizen of the United States, residing at Echo, in the county of Umatilla and State of Oregon, have invented certain new and useful Improvements in Water-Carriers, of which the following is a specification.

This invention relates to an improved carrier, particularly to a carrier in the form of a vehicle or wagon adapted for the transportation of fluid, such as water and the like.

The object of the present invention is to economize space in a vehicle of this character and to dispose the load or weight of the vehicle close behind the draft animals so that the vehicle can be readily turned and otherwise handled during the use of the same.

The invention further contemplates a vehicle of this character in which the liquid is contained in the supporting wheels or rollers to thereby dispose the entire weight of the liquid directly upon the ground so that the force necessary in drawing the device is simply exerted in overcoming the friction of the rollers upon the ground. In this connection it will also be noted that the vehicle or wagon is formed with but two wheels or rollers and that but little weight rests upon the necks of the animals or the tongue of the vehicle so that the draft animals are permitted to exert all their strength in drawing the vehicle, and not in supporting the same.

For a full understanding of the invention and the merits thereof and also to acquire a knowledge of the details of construction, reference is to be had to the following description and accompanying drawings, in which:

Figure 1 is a top plan view of the improved water carrier; Fig. 2 is a side elevation of the water carrier; Fig. 3 is a detail sectional view through one of the hollow rollers; and, Fig. 4 is a detail enlarged sectional view through one of the journal bearings carried in the frame for supporting the hollow rollers.

Corresponding and like parts are referred to in the following description and indicated in all the views of the drawing by the same reference characters.

Referring to the drawing the reference numeral 10 designates a tongue provided across its rear end with a bar 11 extending beyond the edges of the tongue and merging into the outwardly bulged side bars 12. The forward ends of the side bars 12 are turned in and terminate against the edges of the tongue 10 to provide a forward cross bar to the frame of a vehicle. The bars 11 and 13 are reinforced by the provision of diagonal braces 14 carried thereagainst and being attached at their inner ends to the edges of the tongue 10. The sides 12 are bulged out in angular form and carry midway between their ends, and at their angular portions, journal bearings 15. Each of the bearings 15 is formed of a block having a transverse opening therethrough and provided with a turning plug or valve 16 adapted to close the opening. The outer end of the opening is threaded for the reception of a hose connection 17 employed for filling the carrier. Within the frame of the carrier are disposed two hollow rollers 18. Each of the rollers 18 is formed of a pair of oppositely disposed convexed heads having their base or inner portions overlapping to form a tread 19 for engagement with the roadway. The outer head of each of the rollers 18 is formed with a lateral opening of considerable size which is closed by a cap 20. The opening is adapted to admit access to the interior of the roller for the purpose of repair and cleaning. The outer head of each of the rollers is further provided with an air valve 21 which is automatic in operation to admit air to the interior of the roller as the liquid is withdrawn from the same. Each of the heads is provided at its apex with an outwardly extending hollow stub shaft 22 which is flanged or headed at its inner end, as at 23, which flange or head fits snugly against the inner face of the roller 18 and is riveted or otherwise secured thereto. Ribs 24 radiate from the heads 23 and are suitably secured against the inner side of the heads of the rollers to reinforce the same. The stub shafts 22, carried in the outer heads of the rollers, engage in the inner sides of the bearings 15 and are provided with glands or packing rings 25 threaded into enlarged openings in the inner sides of the bearings 15 and engaging loosely about the stub shafts 22. The inner stub shafts 22 are held in a central bearing 26 carried upon the tongue 10, which central bearing carries packing rings 27 adapted to seal the inner ends of the stub shafts 22 within the central bearing and to admit of the independent rotation of the same.

The rear bar 11 of the frame carries outwardly extending ears 28 to which are hinged the upper ends of depending arms 29 carrying across their lower ends a brake beam 30. Brake shoes 31 are supported upon the opposite ends of the brake beam 30 and register with the tread portions 19 of the rollers. It will be noted from Fig. 1 that the brake shoes 31 are recessed in their engaging faces to fit about the inner edges of the treads 19. A connecting rod 32 extends from the brake beam 30, midway between its ends, to the lower end of a hand lever 33 pivoted against one edge of the tongue 10. A seat post 34 is attached to the rear end of the tongue 10, the same being substantially U-form and having its forward arm attached to the tongue at a point adjacent to the hand lever 33. A foot rest 35 is secured across the lower end of the forward arm of the seat post 34 to receive the feet of the operator when mounted upon the seat 36. A doubletree 37, or other draft device is secured across the tongue 10 forwardly of the bars 13.

In filling the rollers or tanks it is only necessary to apply the hose-coupling 17 to one of the bearings 15 when the water pressure forces the water through the bearings 15 and hollow stub shaft 22 into the adjacent roller 18. When the roller 18 is half filled the liquid flows through the inner stub shaft thereof to the central bearing 26 from which it passes through the opposite central stub shaft 22 into the roller 18 in the opposite side of the frame. The water pressure passing through the hose-connection 17 fills the two tanks 18 completely. As the fluid in the tanks is withdrawn from the same, air is admitted into the tanks or rollers 18 through the check valves 21 so as to allow the fluid to flow easily from the tanks.

It will be noted from Fig. 2 that the hinged arms 29 are of considerable length so as to dispose the brake beam 30 close to the ground. This construction is for the purpose of applying the brake shoes 31 to the rollers when the tongue 10 is raised up slightly and the vehicle is moved back through a short distance. As will be readily noted the hand lever 33 is for the purpose of applying the brake shoes 31 to the rollers to ease up the motion of the vehicle in descending steep grades, and in stopping the same.

Having thus described the invention, what is claimed is:

A water carrier comprising a hollow body journaled for rotation, means for filling the body located at the axis about which the body rotates, a vent provided upon the body at one side of its axis, said body having a covered opening located at the opposite side of its axis from that side at which the vent is located.

In testimony whereof, I affix my signature in presence of two witnesses.

WILBERT W. PENRY. [L. S.]

Witnesses:
L. A. ESTEB,
ADDIE C. ESTEB.

---

Copies of this patent may be obtained for five cents each, by addressing the "Commissioner of Patents, Washington, D. C."